(No Model.)
J. CLAYTON.
SLIDING CONNECTION FOR MACHINERY.
No. 326,628. Patented Sept. 22, 1885.
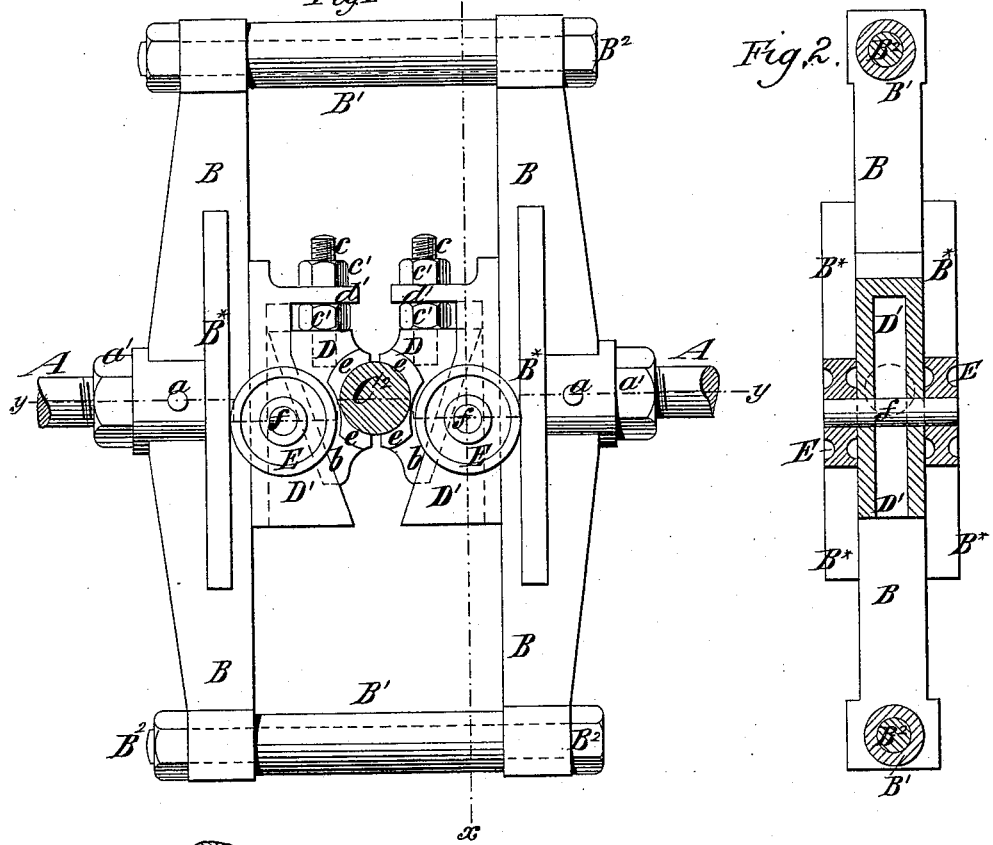
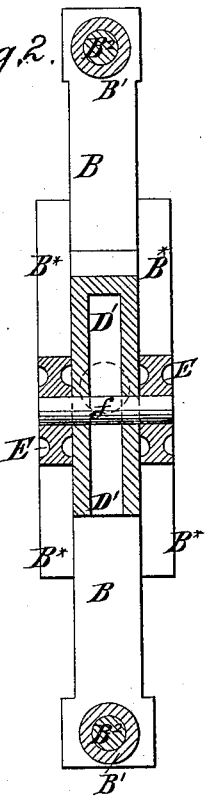
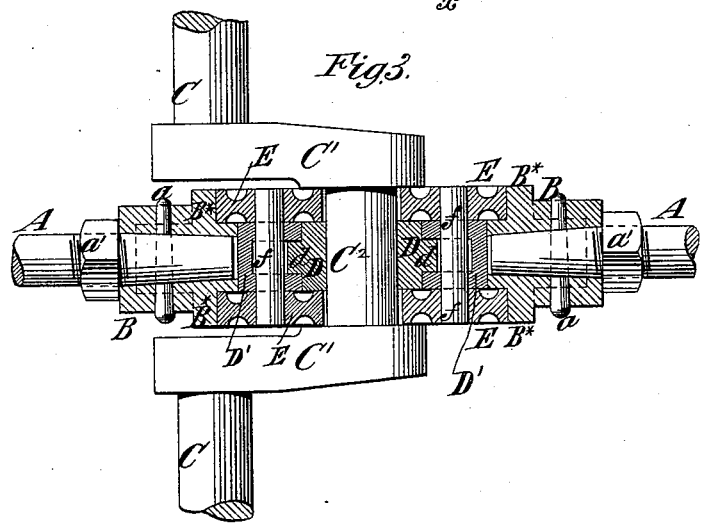
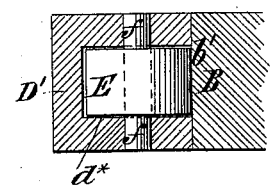
Witnesses:
Emil Hester
Matthew Pollock
Inventor:
James Clayton
by his atty
Bruno Hall

UNITED STATES PATENT OFFICE.

JAMES CLAYTON, OF BROOKLYN, NEW YORK.

SLIDING CONNECTION FOR MACHINERY.

SPECIFICATION forming part of Letters Patent No. 326,628, dated September 22, 1885.

Application filed June 22, 1885. (No model.)

*To all whom it may concern:*

Be it known that I, JAMES CLAYTON, of Brooklyn, in the county of Kings and State of New York, have invented a new and useful Improvement in Sliding Connections for Machinery, of which the following is a specification.

My invention is applicable, generally, to various kinds of machinery wherein a cross-head or sliding box or slide is arranged to reciprocate in a slideway or yoke; but the invention relates more particularly to that class of crank-wrist connections or crank-pin boxes which form the subject of my Letters Patent No. 47,522, dated May 2, 1865. In this form of connection a divided piston-rod has rigidly connected with its two portions, which are in line, a yoke or slideway extending transversely to the line of the rod, and the crank wrist or pin is fitted to a box which is movable in this slideway in a direction transverse to the length of the piston-rod as the crank rotates.

In my Letters Patent above referred to the box for the crank pin or wrist is formed in two halves, which are inclined upon their backs, and between which and the sides of the yoke or slideway are arranged wedge-shaped blocks, which are adjustable by means of a screw and nut relatively to the half-boxes which they support, in order to take up any lost motion between the boxes and the yoke to compensate for wear. This form of connection is very desirable, because it greatly reduces the length of the machine below that which would be necessary in case a connecting-rod is employed. With this form of connection the movement of the box and wedge-blocks in the yoke is most rapid at the time when the piston is at the end of its stroke and the crank is just passing the center, and in an air-compressor the box is at this time subjected to the greatest pressure by reason of the pressure of compressed air upon the pump-piston; hence at the time when the box and wedge-blocks are moving most rapidly in the yoke, the yoke presses most strongly against them, and hence the wear upon the wedge-blocks and yoke is very considerable.

An important object of my present invention is to reduce this wear and to afford the box and wedge-blocks a rolling support upon the yoke, which will decrease the wear of the wedge-blocks and yoke and produce a better operating machine.

My invention consists in the novel combination, with a slideway, a box or slide arranged to reciprocate therein, and wedge-blocks bearing on the opposite sides of the slideway, of rollers interposed between the wedge-blocks and opposite sides of the slideway, and preferably carried by the wedge-blocks, so as to be adjusted with them, as hereinafter particularly described, and pointed out in the claims.

In the accompanying drawings, Figure 1 is a side elevation of a yoke and portions of a piston-rod and box embodying my invention, and including a transverse section of a crank-wrist. Fig. 2 is a vertical section upon the plane of the dotted line $x\, x$, Fig. 1. Fig. 3 is a horizontal section on the plane of the dotted line $y\, y$, Fig. 1, including a plan of a crank; and Fig. 4 is a horizontal section of a wedge-block and a part of a yoke, illustrating a modification of my invention.

Similar letters of reference designate corresponding parts in all the figures.

A A designate the two portions of the divided piston-rod, which are in line and are connected by the yoke. This yoke is, as here represented, composed of two side pieces, B B, cross-pieces or stretchers B' B', arranged between the side pieces and holding them at a proper distance apart, and bolts $B^2$, whereby the side pieces, B, and cross-pieces or stretchers B' are connected together. The portions of the piston-rod A may be secured in the yoke in any suitable manner. As here represented, their ends are slightly taper and fitted to taper sockets in the side pieces of the yoke, wherein they are secured by keys $a$, lock-nut $a'$ being applied to the rod in order to furnish a more secure fastening therefor. This, however, forms no part of my invention.

C designates a portion of a crank-shaft. C' designates the side pieces or cheeks of the crank, and $C^2$ designates the crank pin or wrist.

The crank-pin box is composed of two halves or portions, D D, which are bored to fit the crank-pin $C^2$, and the backs of which are inclined, as indicated at $b$. The two half-boxes D bear against and are supported by wedge-blocks D', the inner sides of which are inclined corresponding to the inclination on the backs of the box-sections D, and the backs of which are straight and parallel, so as to fit against the opposite parallel side portions of the yoke or slideway.

In order to prevent the box-sections D and the wedge-blocks D' from moving on each other in a lateral direction, they may be on their inclined faces tongued or grooved together; and I have here represented the box-sections as each provided with a tongue, $d$, entering a corresponding groove in the inclined faces of the wedge-blocks on which it bears.

By means of bolts or screws $c$, inserted in the box-sections D and passing loosely through lugs or ears $d'$ on the wedge-blocks D', and nuts $c'$, applied to said bolts or screws, provision is afforded for drawing up the wedge-blocks in the yoke relatively to the box-sections D, and thereby taking up any lost motion which may result from wear of the yoke, wedge-blocks, or boxes.

As here represented, the width or thickness of the box-sections and wedge-blocks D D' is not as great as the length of the crank-pin; but the bore of the box-sections is formed in the circular hub or projection $e$ on each side of the box-sections, the bore being through such circular projections, and the crank-pin bearing is equal to the length of the crank-pin $C^2$.

The wedge-blocks D' are provided on opposite sides with rollers E, which may be of steel or hard composition, and which are supported by pins or short shafts $f$, extending through the wedge-blocks D', and projecting laterally beyond each side of such wedge-blocks. The side pieces, B, of the yoke are provided on opposite sides with ribs or projections B*, which are slightly removed from the inner surfaces of the side pieces of the yoke, and which afford bearers or bearing-surfaces for the rollers E, as is best represented in Figs. 1 and 3. The pins or short shafts $f$ may be driven tightly into the wedge-blocks D', so as to be held against turning therein, and the rollers E will then turn freely on the end portions of the pins or shafts $f$, which project beyond the sides of the wedge-blocks. As here shown, the length of the pins $f$ and the distance from outside to outside of each pair of rollers, measured in the direction of the length of said pins $f$, is just equal to the space between the cheek-pieces C' of the crank, and as these cheek-pieces C' overlap the outer sides of the rollers E, as shown clearly in Fig. 3, the rollers will be prevented from slipping off the ends of the pins $f$, and no other means are necessary to hold them in place.

When the machine is constructed properly and ready for operation, the outer parallel sides of the wedge-blocks will have a bearing against the inner sides of the yoke, and the rollers E will bear against the ribs or projections B*; but as the sliding friction of the wedge-blocks D' on the yoke will cause the wedge-block and yoke to wear more rapidly than will the rolling friction of the rollers E upon the ribs or projections B*, the wedge-blocks and yoke will soon become slightly worn, so that as the box and wedge-blocks slide to and fro in the yoke the principal part of the pressure will be sustained by the rollers E and ribs or bearers B*. The fit of the wedge-blocks against the opposite sides of the yoke will, however, steady the wedge-blocks in the yoke and prevent any oscillation thereof by reason of the short bearing-surfaces afforded by the rollers alone.

In Fig. 1 I have represented the centers of the rollers E as slightly below the axis of the piston-rod; but these rollers will be raised as the wedge-blocks are adjusted from time to time relatively to the box-sections D, and will thereby be brought up to and finally above the axis of the piston-rod.

In lieu of having the rollers upon the exterior of the wedge-blocks at opposite sides thereof they may be arranged as shown in Fig. 4. In this figure, B designates one of the side portions of the yoke, and D' a wedge-block bearing against said side portion and recessed upon its inner and back side at $d^*$, so as to receive and conceal a roller, E, within it, this roller being free to turn upon a pin, $f$. In this case the wedge-blocks D' and the roller E would both bear against the same flat surface, $b'$, of the side portion of the yoke; but as the sliding friction of the block D' on the yoke B would be greater than the rolling friction of the roller E on the yoke, the block and yoke will soon wear down slightly, so that the pressure will be mainly supported by the roller E, and thereafter the wear will be very much less rapid.

What I claim as my invention, and desire to secure by Letters Patent, is—

1. The combination, with a slideway and a box or slide working therein, of wedge-blocks between the box or slide and the sides of the slideway, and adjustable relatively to the box or slide to compensate for wear, and rollers interposed between the wedge-blocks and the sides of the slideway, substantially as herein described.

2. The combination, with a slideway and a box or slide working therein, of wedge-blocks between the box or slide and the sides of the slideway, and adjustable relatively to the box or slide to compensate for wear, and rollers journaled upon the wedge-blocks and bearing on opposite sides of the slideway, substantially as herein described.

3. The combination, with a piston-rod and a yoke or slideway arranged transversely therein, of a divided box, D D, and wedge-blocks D' D', interposed between the box-sections and the sides of the yoke, and rollers interposed between the wedge-blocks and the yoke, and serving to sustain the pressure of the yoke upon the wedge-blocks as they move to and fro in the yoke, substantially as herein described.

4. The combination, with a piston-rod and a yoke or slideway arranged transversely therein, of a divided box, D D, and wedge-blocks D', whereby the box-sections are supported, and rollers pivoted to the wedge-blocks and bearing upon the yoke, and movable with the wedge-blocks to and fro in the yoke, substantially as herein described.

5. The combination, with a piston-rod and a yoke arranged transversely therein, and provided on opposite sides with ribs or bearers slightly rearward of its face, of a divided box, D, and wedge-blocks D', movable in the yoke and supported on opposite sides thereof, and rollers pivoted upon the wedge-blocks and running upon the bearers of the yoke, substantially as herein described.

6. The combination, with the side portions, B P, of a yoke constructed with ribs or bearers B*, of a divided box, D D, and wedge-blocks D', fitted to the yoke, rollers E, and pins $f$, inserted in the wedge-blocks, and on which the rollers are journaled, and a crank-wrist, $C^2$, fitting the box D, and side portions or cheeks, C', overlapping the rollers E, substantially as and for the purpose herein described.

JAMES CLAYTON.

Witnesses:
C. HALL,
FREDK. HAYNES.